(12) United States Patent
Desai

(10) Patent No.: US 9,506,576 B2
(45) Date of Patent: Nov. 29, 2016

(54) CHECK VALVE APPARATUSES AND METHODS

(75) Inventor: Ashvin D. Desai, Lumberton, NC (US)

(73) Assignee: TITAN FLOW CONTROL, INC., Lumberton, NC (US)

( * ) Notice: Subject to any disclaimer, the term of this patent is extended or adjusted under 35 U.S.C. 154(b) by 188 days.

(21) Appl. No.: 12/542,364

(22) Filed: Aug. 17, 2009

(65) Prior Publication Data

US 2011/0036408 A1 Feb. 17, 2011

(51) Int. Cl.
*F16K 15/06* (2006.01)

(52) U.S. Cl.
CPC ........ *F16K 15/063* (2013.01); *Y10T 137/0318* (2015.04); *Y10T 137/7837* (2015.04)

(58) Field of Classification Search
CPC ......... F15D 1/00; F16K 15/00; F16K 15/063
USPC ................. 137/533.25, 540, 543.23
See application file for complete search history.

(56) References Cited

U.S. PATENT DOCUMENTS

| | | | | |
|---|---|---|---|---|
| 209,975 | A | * | 11/1878 | Morey ....................... 137/533.25 |
| 442,284 | A | * | 12/1890 | Craig ......................... 137/533.25 |
| 1,077,415 | A | * | 11/1913 | Massey ...................... 137/533.25 |
| 1,105,255 | A | * | 7/1914 | Caskey ...................... 137/543.23 |
| 1,329,559 | A | | 2/1920 | Tesla |
| 1,470,018 | A | * | 10/1923 | Love et al. ............... 137/533.25 |
| 2,255,404 | A | * | 9/1941 | White et al. .............. 137/543.23 |
| 2,356,360 | A | * | 8/1944 | Smolensky ............... 137/543.23 |
| 2,447,729 | A | * | 8/1948 | Bertea ....................... 137/543.23 |
| 2,943,639 | A | * | 7/1960 | Smith ........................ 137/543.23 |
| 2,983,281 | A | * | 5/1961 | Bynum ..................... 137/543.23 |
| 3,002,528 | A | * | 10/1961 | Leissner .................... 137/543.19 |
| 3,209,777 | A | * | 10/1965 | Salisbury .................. 137/543.13 |
| 4,257,443 | A | * | 3/1981 | Turney ..................... 137/543.19 |

(Continued)

FOREIGN PATENT DOCUMENTS

| | | |
|---|---|---|
| CN | 2196718 | 5/1995 |
| CN | 2851767 | 12/2006 |

(Continued)

OTHER PUBLICATIONS

Chinese Office Action for Application No. 201010167601.3 dated May 6, 2013.

(Continued)

*Primary Examiner* — Mary McManmon
*Assistant Examiner* — Nicole Wentlandt
(74) *Attorney, Agent, or Firm* — Jenkins, Wilson, Taylor & Hunt, P.A.

(57) ABSTRACT

The present subject matter relates to check valve apparatuses and methods. In particular, the present subject matter relates to a flow control device that can be incorporated into a check valve. The flow control device can include a valve seat configured for positioning within an inlet of a check valve, the valve seat defining an opening, a plurality of flow routing vanes at least partially traversing the opening, and a disk movable between a first position and a second position in response to a fluid pressure. When the disk is in the first position, the disk blocks the opening of the valve seat, and when the disk is in the second position, the opening is substantially unobstructed. The flow routing vanes can function to smooth the flow of fluid into the valve, thereby reducing pressure drop, noise, erosion, corrosion, vibration, and cavitations.

18 Claims, 7 Drawing Sheets

(56) References Cited

U.S. PATENT DOCUMENTS

| | | | | |
|---|---|---|---|---|
| 5,297,579 | A | * | 3/1994 | McConnell et al. ...... 137/533.25 |
| 6,079,449 | A | * | 6/2000 | Gerber ........................... 137/859 |
| 2003/0178068 | A1 | * | 9/2003 | Simmons, Jr. ................. 137/538 |
| 2003/0221728 | A1 | * | 12/2003 | Enerson ......................... 137/541 |

FOREIGN PATENT DOCUMENTS

| | | |
|---|---|---|
| CN | 200946700 | 9/2007 |
| CN | 101220878 | 7/2008 |

OTHER PUBLICATIONS

Chinese Office Action for Application No. 201010167601.3 dated Feb. 21, 2014.
Chinese Office Action for Application No. 201010167601.3 dated Jul. 8, 2014.
Chinese Decision of Rejection for Application No. 201010167601.3 dated Dec. 23, 2014.
Notification of Reexamination for Chinese Patent Application Serial No. 201010167601.3, dated Jul. 22, 2015.

* cited by examiner

CHECK VALVE APPARATUSES AND METHODS

TECHNICAL FIELD

The subject matter disclosed herein relates generally to valves for use in fluid flow applications. More particularly, the subject matter disclosed herein relates to check valve designs.

BACKGROUND

A check valve is generally a valve that allows fluid (i.e., liquid or gas) to flow through it in only one direction. Common designs for check valves can include a movable portion, such as a disk or a ball, which is sized to block an inlet of the valve. When sufficient pressure is applied to the inlet, sometimes referred to as the cracking pressure, the movable portion can be unseated so that fluid can flow past the movable portion and through the valve. If higher pressure is developed in the opposite direction or fluid flow stops (e.g., the pump stops), the movable portion is pressed back against the inlet to prevent any fluid from flowing upstream of the valve.

Although valves based on this simple design have been used for decades, such valves often exhibit problems in one or more of pressure drop, noise, erosion, corrosion, vibration, and cavitation. It is believed that many of these problems arise as a result of turbulent flow entering the valve inlet, which can cause uneven wearing of the valve inlet and the movable portion. Further, the turbulent flow against the movable portion can cause the movable portion to rotate in place, resulting in energy losses of the fluid flowing through the valve.

Reduction in the turbulent flow through the valve can be accomplished by ensuring that the fluid flows uniformly to the valve inlet. One way of ensuring this uniform flow is to provide a minimum length of straight pipe that the fluid must flow through before reaching the valve. For instance, it is often recommended that a check valve be installed no less than 5 pipe diameters downstream from a reducer, expander, bend, or isolating valve, and no less than 2 diameters upstream of such a component. Although such system designs can improve valve operation, the amount of space required for a long run of straight pipe can be burdensome in many situations. As a result, improved designs for a check valve would be desirable to improve valve efficiency, operation, and longevity without requiring large-scale piping system constraints.

SUMMARY

In accordance with this disclosure, check valve apparatuses and methods are provided. In one aspect, a flow control device for a check valve is provided. The flow control device can include a valve seat configured for positioning within an inlet of a check valve, the valve seat defining an opening, a plurality of flow routing vanes at least partially traversing the opening, and a disk movable between a first position and a second position in response to a fluid pressure and volume of flow. When the disk is in the first position, the disk blocks the opening of the valve seat, and when the disk is in the second position, the opening is substantially unobstructed.

In another aspect, a check valve assembly is provided. The check valve assembly can include a valve body having an inlet and an outlet, a valve seat positioned within the inlet, the valve seat defining an opening, a plurality of flow routing vanes at least partially traversing the opening, and a disk movable between a first position and a second position in response to a fluid pressure and volume of flow. When the disk is in the first position, the disk blocks the opening of the valve seat, and when the disk is in the second position, the opening is substantially unobstructed.

In another aspect, a method for improving the performance of a check valve is provided. The method can include positioning a valve seat within an inlet of a check valve body, the valve seat defining an opening, at least partially traversing the opening with a plurality of flow routing vanes, and flowing a fluid through the plurality of flow routing vanes before passing the fluid into the check valve body. In this way, flow of the fluid is smoothed by the flow routing vanes.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
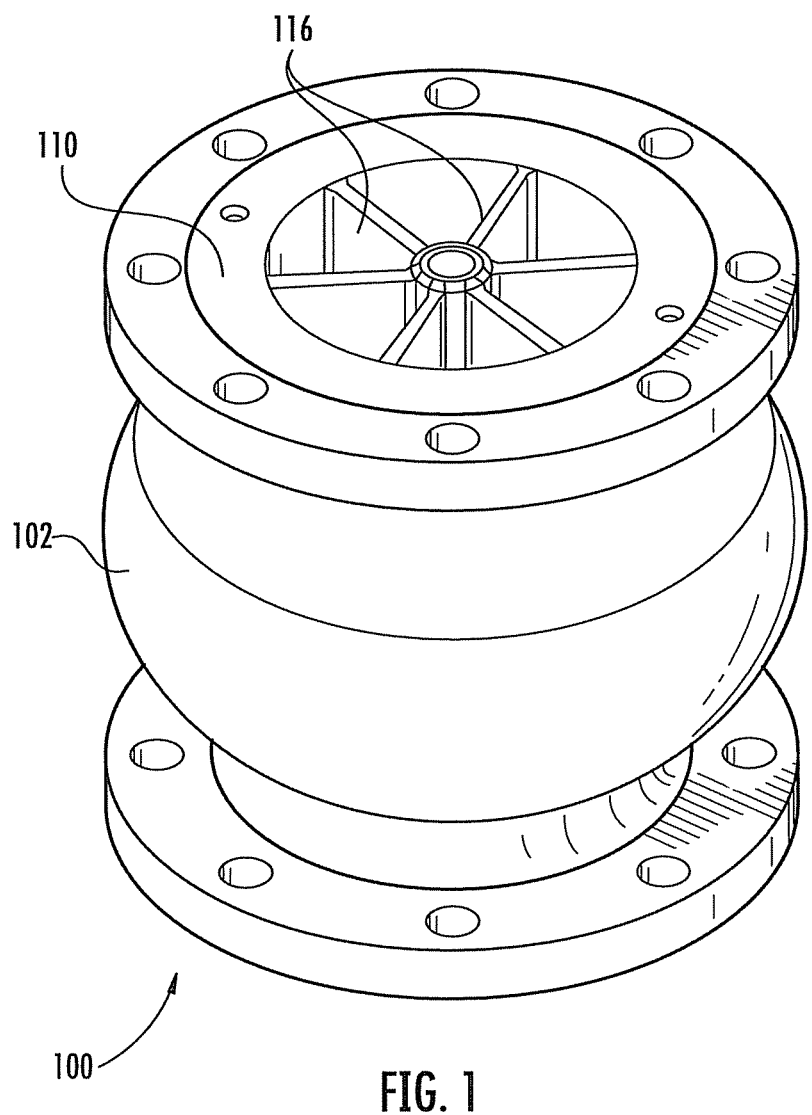
FIG. 1 is a perspective view of a check valve including a flow control seat assembly according to an embodiment of the presently disclosed subject matter.
Figure 2:
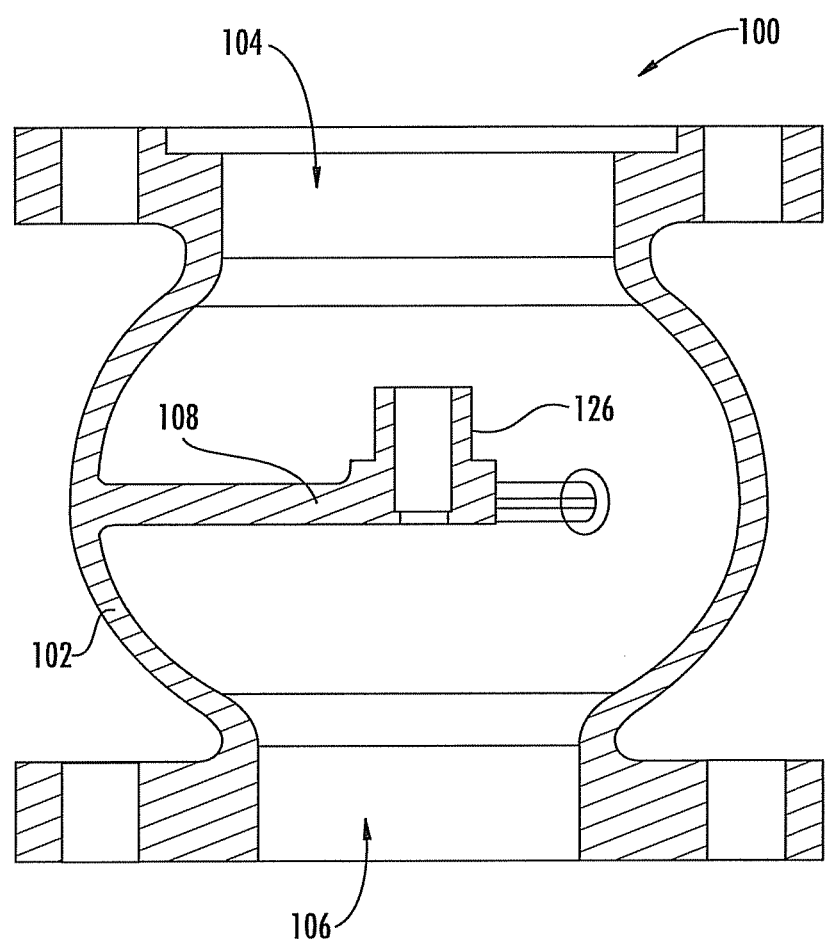
FIG. 2 is a sectional side view of a check valve body for use with a flow control seat assembly according to an embodiment of the presently disclosed subject matter.

The present subject matter provides check valve apparatuses and methods. Referring to FIGS. 1 and 2, a check valve, generally designated 100, can include a valve body 102 having an inlet 104 and an outlet 106. Check valve 100 can be shaped substantially the same as current check valves designs so that it can possess the same pressure rating and size and thus be easily installed in place of a traditional valve.

In one aspect, the presently disclosed subject matter provides a flow control device 110 that can be positioned in inlet 104. Flow control device 110, which is shown in more detail in FIGS. 3 and 4, can include a valve seat 112 configured for positioning within inlet 104 of check valve 100, and valve seat 112 can define an opening 114 through which fluid can flow.

Figure 5A:
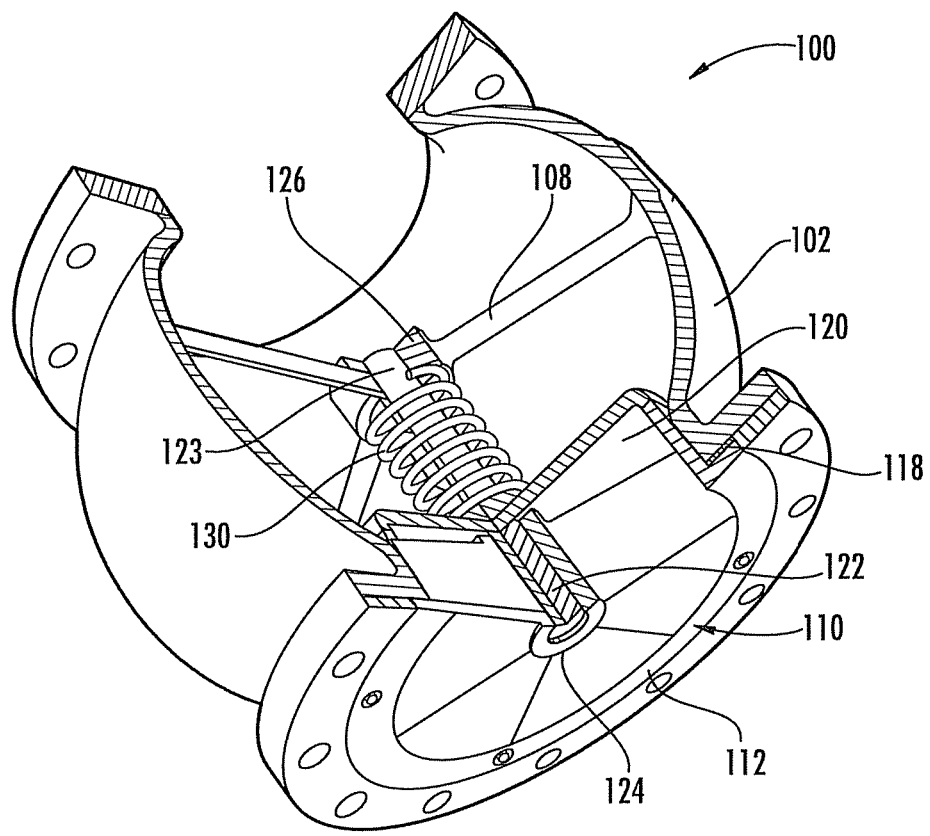
FIG. 5A is a cutaway perspective view of a check valve according to an embodiment of the presently disclosed subject matter with the disk in a valve closed position.
Figure 5B:
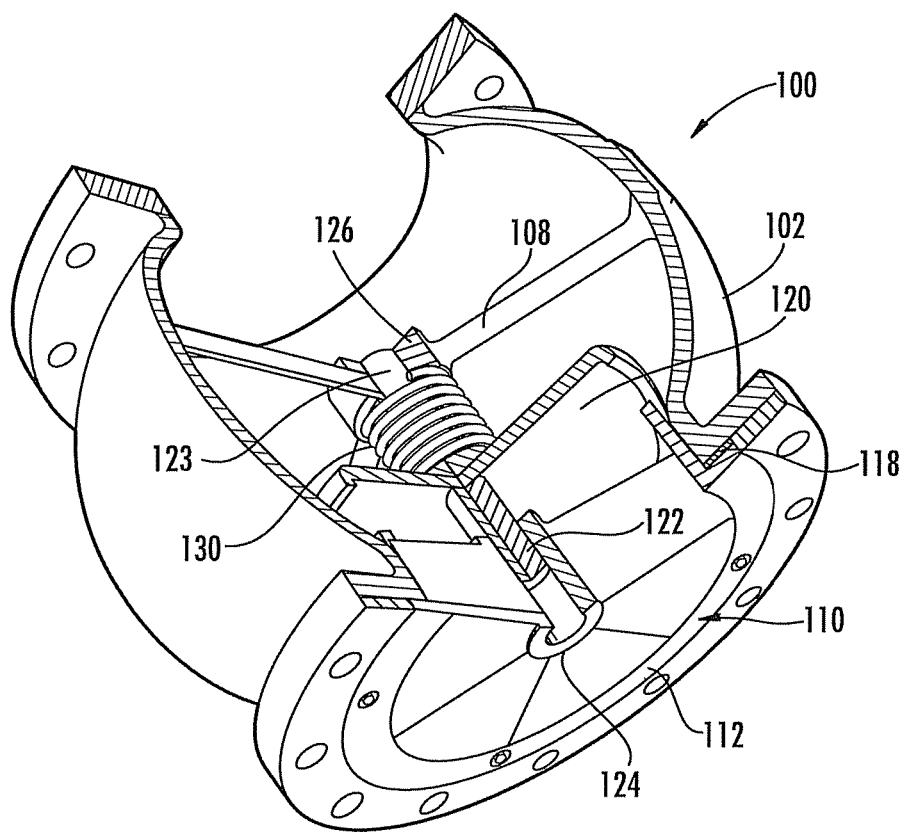
FIG. 5B is a cutaway perspective view of a check valve according to an embodiment of the presently disclosed subject matter with the disk in a valve open position.
Figure 6:
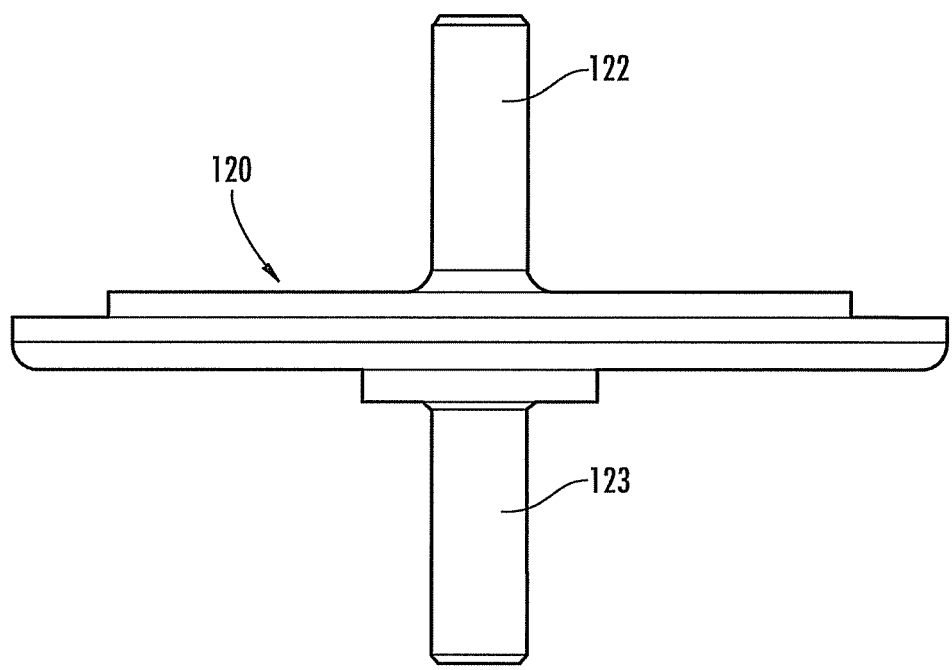
FIG. 6 is a side view of a disk for use in a check valve according to an embodiment of the presently disclosed subject matter.

A disk 120 can be movable with respect to flow control device 110 between a first position and a second position in response to a fluid pressure. Specifically, when disk 120 is in the first position, shown in FIG. 5A, disk 120 can block opening 114 of valve seat 112. When disk 120 is in the second position, shown in FIG. 5B, opening 114 can be substantially unobstructed. Referring to FIG. 6, disk 120 can include an upstream disk stem 122 extending from an upstream-facing surface of disk 120 and a downstream disk stem 123 extending from a downstream-facing surface of disk 120. In some aspects, disk 120 can comprise a multi-planar contour. For example, as illustrated in FIG. 6, disk 120 can comprise a first planar surface having a first diameter, a second planar surface having a second diameter, and a third planar surface having a third diameter, where the three planar surfaces can be disposed or layered on top of one another such that the first planar surface can be closest to outlet 106 or upstream disk stem 122, and the third planar surface can be closest to inlet 104 or downstream disk stem 123, while the second planar surface can be disposed therebetween. In this example, and as illustrated in FIG. 6, the first diameter can be smaller than the second and third diameters, and the second diameter can be larger than the first and third diameters, such that the third diameter can be sized between the second diameter and the first diameter. To guide the movement of disk 120 between the first and second positions, flow control device 110 can include a valve inlet disk guide 124, which can constrain the movement of disk 120 between the first position and the second position to be in a predefined path. For instance, inlet disk guide 124 can be attached to valve seat 112, and upstream disk stem 122 can be received by inlet disk guide 124.

Figure 3:
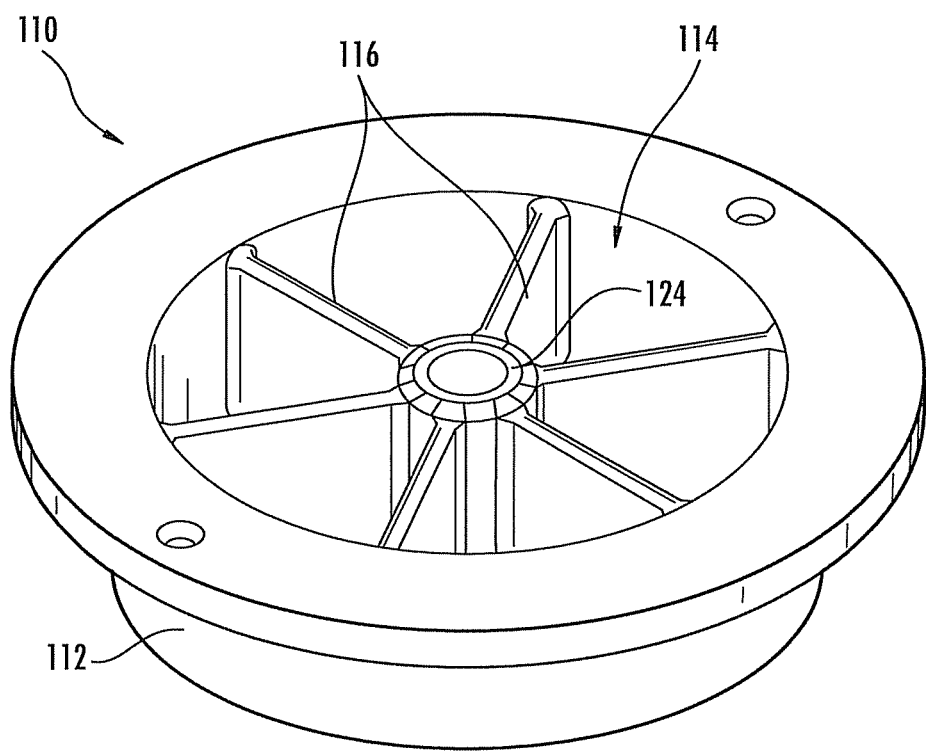
FIG. 3 is a perspective view of a flow control seat assembly for use with a check valve according to an embodiment of the presently disclosed subject matter.
Figure 4:
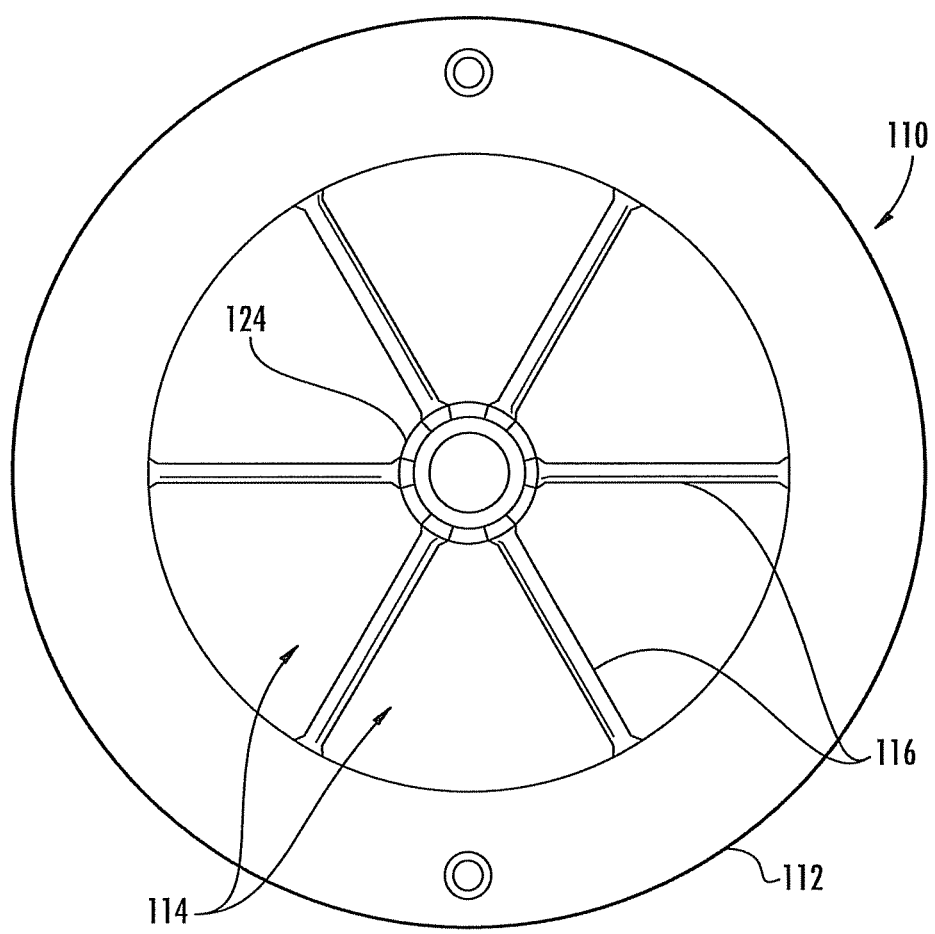
FIG. 4 is a top plan view of a flow control seat assembly for use with a check valve according to an embodiment of the presently disclosed subject matter.

Flow control device 110 can further include a plurality of flow routing vanes 116 at least partially traversing opening 114. Vanes 116 can be evenly spaced about a center of opening 114, and each of vanes 116 can have a shape of a flat plate oriented substantially parallel to the direction of fluid flow into valve 100. Specifically, for example, one end of each of vanes 116 can be attached to an interior surface of valve seat 112, and the other end of each of vanes 116 can meet at a center of opening 114. In this arrangement, opening 114 can be segmented into a plurality of wedge-shaped passageways. More particularly, as is shown in FIGS. 3 and 4, each of vanes 116 can extend between valve seat 112 and inlet disk guide 124 positioned at a center of opening 114. Of course, it should be understood that other arrangements of vanes 116 traversing opening 114 can be used to perform a flow routing function discussed herein.

Regardless of the specific arrangement, vanes 116 can alter an incoming turbulent fluid flow to become laminar, thereby providing a uniform inlet flow before the fluid impacts disk 120 and enters valve body 102. This change in the inlet flow can help to reduce pressure drop, noise, erosion, corrosion, vibration, and cavitations, which in turn can improve the valve flow coefficient (Cv) and can help to prevent valve chattering and premature valve failure. In addition, the ability of vanes 116 to alter the character of the fluid flow can reduce or eliminate the requirement that a lengthy straight pipe section be provided upstream or downstream of valve 100. As a result, other piping elements, such as a reducer, expander, bend, or isolating valve, can be installed much closer to valve 100 without detrimentally affecting the performance of the fluid system. In particular, for example, a butterfly valve can be installed directly adjacent to valve 100 at outlet 106.

Any number of vanes 116 can be used in flow control device 110 (e.g., as few as two vanes). For instance, flow control device 110 shown in FIGS. 3 and 4 has six vanes 116 extending from a center of opening 114 to an inner surface of valve seat 112. Specifically, vanes 116 can support inlet disk guide 124 at the center of opening 114. It is to be understood, however, that although additional vanes 116 can likely improve flow smoothing, this improvement must be balanced against the decrease in inlet area and additional manufacturing costs associated with the inclusion of additional vanes.

It is expected that flow control device 110 can be sized to be installed in an existing check valve (e.g., a Titan FCI all center guided silent check valve). As a result, check valve performance can be improved. In addition, flow control device 110 can be designed to be used in any of a variety of valve configurations, classes, and/or sizes. For instance, although flow control device 110 is described and shown herein as being used in a disk check valve, it should be understood that altering the inlet fluid flow can be advantageously applied to any of a variety of check valve designs, including ball check valves, diaphragm check valves, swing check valves, and wafer check valves, among others. Further, because flow control device 110 can be designed to be interchangeable in valves from a variety of valve designs, inventories for valve repairers can be reduced.

Alternatively, in another aspect, the presently disclosed subject matter provides that flow control device 110 can be a part of an improved design for check valve 100. Similar to the embodiment discussed above and referring again to FIGS. 1 and 2, check valve 100 can include a valve body 102 having an inlet 104 and an outlet 106. Flow control device 110 discussed above can be positioned within inlet 104. A gasket 118 can be positioned between valve seat 112 and valve body 102. Gasket 118 can provide additional sealing independent of any flange gasket positioned between inlet 102 and upstream piping.

As discussed above, a disk 120 can be movable with respect to flow control device 110 (e.g., within valve body 102) between a first position (See, e.g., FIG. 5A) in which disk 120 blocks opening 114 of valve seat 112 and a second position (See, e.g., FIG. 5B) in which opening 114 is substantially unobstructed. In addition to valve seat 112 including an inlet disk guide 124 for constraining the movement of disk 120 when moving between the first position and the second position, valve body 102 can further include a body disk guide 126 to likewise guide the motion of disk 120. In this configuration, disk 120 can include multiple disk stems: upstream disk stem 122 can extend from an upstream-facing surface of disk 120 toward inlet disk guide 124, and a downstream disk stem 123 can extend from a downstream-facing surface of disk 120 toward body disk guide 126. As a result, disk 120 can be securely constrained to move in a substantially linear motion between the first and second positions in a direction parallel to the flow of fluid into valve 100.

A biasing element 130 can be positioned between disk 120 and an internal portion 108 of valve body 102 to bias disk 120 towards the first position. For instance, biasing element 130 can be a cylindrical compression spring positioned between a downstream surface of disk 120 and internal portion 108. Biasing element 130 can be formed from any of a variety of materials, including stainless steel or more exotic spring materials, such as Monel or Inconel 750-X.

By using a substantially uniform-diameter compression spring, internal portion 108 need only provide a minimum area against which biasing element 130 is pressed. For instance, body disk guide 126 can provide a sufficient backstop to biasing element 130. In contrast, many existing disk-check valve designs employ springs having a more conical shape that requires a large area backstop within the valve body, which can result in flow out of the valve being substantially restricted. Accordingly, the use of a cylindrical compression spring as biasing element 130 can ensure that once fluid passes around disk 120, it is relatively unobstructed in its continued flow out of valve body 102 and towards downstream components, helping to lower the overall pressure drop of valve 100.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A check valve assembly comprising:
   a valve body having an inlet and an outlet, wherein the valve body between the inlet and the outlet comprises a substantially curved shape with a diameter largest at a center of the substantially curved shape of the valve body;
   a valve seat positioned within the inlet, the valve seat defining an opening;
   a plurality of flow routing vanes at least partially traversing the opening, the plurality of flow routing vanes comprising a number of flow routing vanes sufficient to alter turbulent flow through the opening to become laminar;
   a movable member movable between a first position and a second position in response to a fluid pressure, the movable member comprising a substantially planar cylindrical disk;
   at least one stem extending from at least one surface of the substantially planar cylindrical disk;
   a spring for biasing the movable member towards the first position, wherein when the movable member is in the first position, the spring axially extends more than half of a length of the at least one stem; and
   an internal portion integrally formed with the valve body and disposed substantially midway between the inlet and the outlet in a flow direction at the center of the substantially curved shape of the valve body where the diameter is largest, the internal portion comprising a body disk guide against which the spring can be pressed;
   wherein when the movable member is in the first position, the movable member blocks the opening of the valve seat, and when the movable member is in the second position, the opening is substantially unobstructed;
   wherein the substantially planar cylindrical disk comprises a multiplanar contour comprising a first planar portion having a first diameter, a second planar portion having a second diameter, and a third planar portion having a third diameter, the three planar portions being layered on top of one another such that the first planar portion is the closest to the outlet and the third planar portion is closest to the inlet, while the second planar portion is disposed therebetween;
   wherein the first diameter is smaller than the second and third diameters, and the second diameter is larger than the first and third diameters, such that the third diameter is sized between the second diameter and the first diameter; and
   wherein each of the three planar portions comprises a circumferential surface edge, each of the circumferential surface edges being parallel to one another.

2. The check valve assembly of claim 1, wherein the valve seat comprises an inlet disk guide, the body disk guide and the inlet disk guide constraining movement of the disk between the first position and the second position to be in a predefined path.

3. The check valve assembly of claim 2, wherein the disk comprises an upstream disk stem movable along the inlet disk guide and a downstream disk stem movable along the body disk guide.

4. The check valve assembly of claim 2, wherein the inlet disk guide is positioned at a center of the opening in the valve seat and each of the plurality of flow routing vanes extends from the inlet disk guide to the valve seat.

5. The check valve assembly of claim 1, wherein the plurality of flow routing vanes comprises more than three vanes.

6. The check valve assembly of claim 5, wherein the plurality of flow routing vanes comprises six vanes.

7. The check valve assembly of claim 1, wherein the spring is a cylindrical compression spring.

8. The check valve assembly of claim 1, comprising a gasket positioned between the valve seat and the valve body.

9. The check valve assembly of claim 1, wherein the valve body comprises a wafer valve body.

10. A flow control device for a check valve comprising:
    a valve seat configured for positioning within an inlet of a check valve body, the valve seat defining an opening, wherein the check valve body between the inlet and an outlet of the check valve seat comprises a substantially curved shape with a diameter largest at a center of the substantially curved shape of the check valve body;
    a plurality of flow routing vanes at least partially traversing the opening, the plurality of flow routing vanes comprising a number of flow routing vanes sufficient to alter turbulent flow through the opening to become laminar;
    a substantially planar cylindrical disk movable between a first position and a second position in response to a fluid pressure;
    at least one stem extending from at least one surface of the substantially planar cylindrical disk;
    a spring for biasing the substantially planar cylindrical disk towards the first position, wherein when the substantially planar cylindrical disk is in the first position, the spring axially extends more than half of a length of the at least one stem; and
    an internal portion integrally formed with the check valve body and disposed substantially midway between the inlet and the outlet of the check valve body in a flow direction at the center of the substantially curved shape of the check valve body where the diameter is largest, the internal portion comprising a body disk guide against which the spring can be pressed;
    wherein when the disk is in the first position, the disk blocks the opening of the valve seat, and when the disk is in the second position, the opening is substantially unobstructed;
    wherein the substantially planar cylindrical disk comprises a multiplanar contour comprising a first planar portion having a first diameter, a second planar portion having a second diameter, and a third planar portion having a third diameter, the three planar portions being layered on top of one another such that the first planar portion is the closest to the outlet and the third planar portion is closest to the inlet, while the second planar portion is disposed therebetween;

wherein the first diameter is smaller than the second and third diameters, and the second diameter is larger than the first and third diameters, such that the third diameter is sized between the second diameter and the first diameter; and wherein each of the three planar portions comprises a circumferential surface edge, each of the circumferential surface edges being parallel to one another.

11. The flow control device of claim 10, wherein the valve seat comprises an inlet disk guide, the inlet disk guide constraining movement of the disk between the first position and the second position to be in a predefined path.

12. The flow control device of claim 11, wherein the disk comprises an upstream disk stem movable along the inlet disk guide.

13. The flow control device of claim 11, wherein the inlet disk guide is positioned at a center of the opening in the valve seat and each of the plurality of flow routing vanes extends from the inlet disk guide to the valve seat.

14. The flow control device of claim 10, wherein the plurality of flow routing vanes comprises more than three vanes.

15. The check valve assembly of claim 14, wherein the plurality of flow routing vanes comprises six vanes.

16. A method for improving the performance of a check valve, comprising:

positioning a valve seat within an inlet of a check valve body, the valve seat defining an opening, wherein the check valve body between the inlet and an outlet of the check valve seat comprises a substantially curved shape with a diameter largest at a center of the substantially curved shape of the check valve body, and the check valve comprising a substantially planar cylindrical disk movable within the check valve body, at least one stem extending from at least one surface of the substantially planar cylindrical disk, a spring that biases the substantially planar cylindrical disk towards a first position blocking the opening of the valve seat, wherein when the substantially planar cylindrical disk is in the first position, the spring axially extends more than half of a length of the at least one stem, and an internal portion integrally formed with the check valve body and disposed substantially midway between the inlet and the outlet of the check valve body in a flow direction at the center of the substantially curved shape of the check valve body where the diameter is largest, the internal portion comprising a body disk guide against which the spring can be pressed, wherein the substantially planar cylindrical disk comprises a multiplanar contour comprising a first planar portion having a first diameter, a second planar portion having a second diameter, and a third planar portion having a third diameter, the three planar portions being layered on top of one another such that the first planar portion is the closest to the outlet and the third planar portion is closest to the inlet, while the second planar portion is disposed therebetween, wherein the first diameter is smaller than the second and third diameters, and the second diameter is larger than the first and third diameters, such that the third diameter is sized between the second diameter and the first diameter, and wherein each of the three planar portions comprises a circumferential surface edge, each of the circumferential surface edges being parallel to one another;

at least partially traversing the opening with a plurality of flow routing vanes, the plurality of flow routing vanes comprising a number of flow routing vanes sufficient to alter an incoming turbulent flow through the opening to become laminar; and flowing a fluid through the plurality of flow routing vanes before passing the fluid into the check valve body and against the disk, such that the incoming turbulent flow of the fluid is reduced to laminar flow.

17. The method of claim 16, wherein at least partially traversing the opening with a plurality of flow routing vanes comprises positioning more than three vanes across the opening of the valve seat.

18. The method of claim 17, wherein at least partially traversing the opening with a plurality of flow routing vanes comprises positioning six vanes across the opening of the valve seat.

* * * * *